United States Patent [19]

Spani

[11] Patent Number: 4,665,391

[45] Date of Patent: May 12, 1987

[54] EMPTY CONTAINER DETECTOR

[75] Inventor: Wayne M. Spani, San Diego, Calif.

[73] Assignee: Warner-Lambert Company, Morris Plains, N.J.

[21] Appl. No.: 834,698

[22] Filed: Feb. 27, 1986

[51] Int. Cl.⁴ .............................................. G01F 23/28
[52] U.S. Cl. ...................................... 340/619; 73/293; 250/577
[58] Field of Search .......................... 340/619; 73/293; 250/577, 573, 357.1

[56] References Cited

U.S. PATENT DOCUMENTS

| | | | |
|---|---|---|---|
| 2,835,252 | 5/1958 | Mauchel | 128/214 |
| 3,636,360 | 1/1972 | Oishi et al. | 250/577 |
| 4,114,144 | 9/1978 | Hyman | 340/632 |
| 4,244,365 | 1/1981 | McGill et al. | 128/214 E |
| 4,312,341 | 1/1982 | Zissimopoulos et al. | 128/214 E |
| 4,344,429 | 8/1982 | Gupton et al. | 128/214 R |
| 4,366,384 | 12/1982 | Jensen | 250/575 |
| 4,367,736 | 1/1983 | Gupton | 128/214 E |

FOREIGN PATENT DOCUMENTS

| | | | |
|---|---|---|---|
| 2406640 | 8/1975 | Fed. Rep. of Germany | 73/293 |
| 2437798 | 2/1976 | Fed. Rep. of Germany | 73/293 |
| 2855651 | 6/1980 | Fed. Rep. of Germany | 73/293 |
| 1417111 | 12/1975 | United Kingdom | 340/619 |

OTHER PUBLICATIONS

Spani, Wayne: "Circuit Optimizes Optical-Switch Biasing" *EDN*, Sep. 20, 1979.

Primary Examiner—Stewart J. Levy
Assistant Examiner—Joseph W. Roskos
Attorney, Agent, or Firm—Workman, Nydegger & Jensen

[57] ABSTRACT

An empty container detector comprises a photoelectric transducer associated with the fluid container which generates a variable control signal to alternately indicate whether the light path of the photoelectric transducer is being refracted by a fluid. A second photoelectric transducer is associated with the fluid container above the fluid level in the container to establish a reference signal corresponding to the condition wherein the light path is not refracted or attenuated by the presence of a fluid. Electrical means are provided to connect the first photoelectric transducer to the second photoelectric transducer to linearize and normalize the reference signal with the control signal. A comparator is associated with the photoelectronic transducers and connected to an alarm which indicates when the control signal is substantially equivalent to the reference signal and thus indicating the lowering of the fluid level below the light path of the first photoelectric transducer.

11 Claims, 6 Drawing Figures

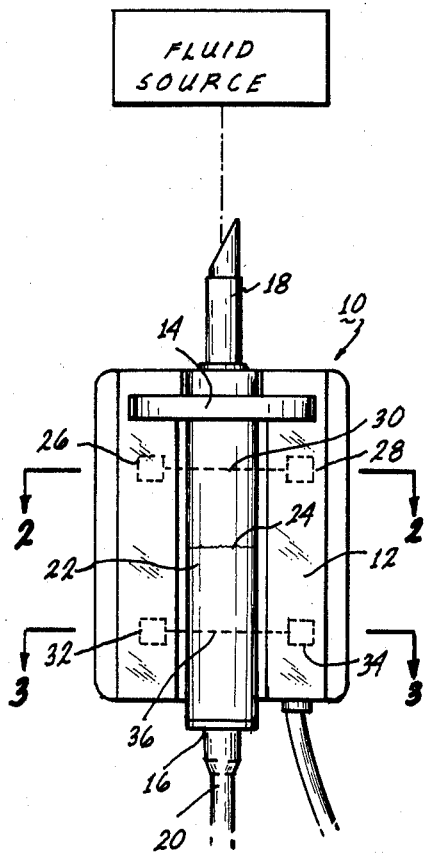
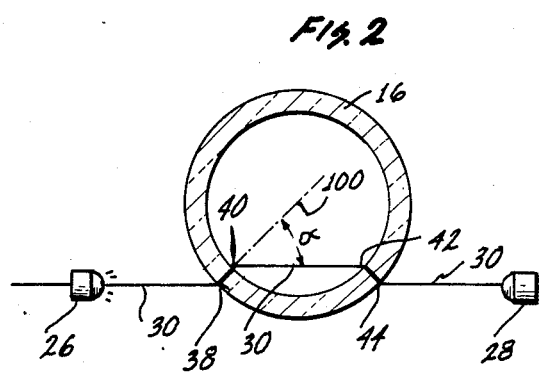
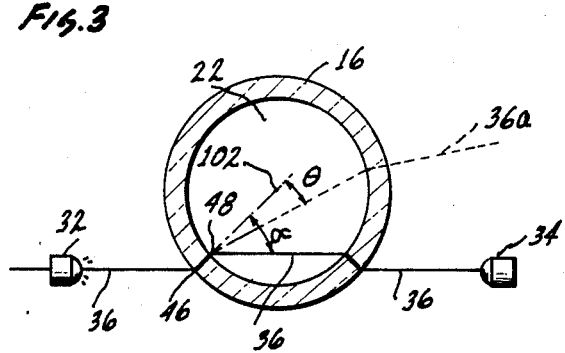

EMPTY CONTAINER DETECTOR

BACKGROUND OF THE INVENTION

This invention relates generally to fluid level detectors. More particularly, this invention relates to a fluid level detector which can be associated with a fluid container to indicate when the container is empty of fluid. The present invention is particularly, but not exclusively, useful in the health care field for detecting the completion of fluid infusion by monitoring the fluid level of a drip chamber associated with the fluid source.

DESCRIPTION OF THE PRIOR ART

In the medical device field, the possibility of air entering an IV administration set is a major concern. Accordingly, attempts have been made to determine when air is present in the IV line between the fluid source and the patient and many devices have been proposed for this purpose. For example, U.S. Pat. No. 4,114,144 to Hyman, which is assigned to the same assignee as the present invention, discloses one of several types of air-in-line detectors which employ optical circuits. In their operation, such air-in-line detectors typically rely on the physical properties of fluids present in the IV tube to refract a light beam. They make use of the refractive properties of fluids for directing a light beam onto or away from a photoelectric sensor and use the consequent sensor signal to indicate the presence or absence of a fluid. In a refinement of this technology, an air-in-line detector as disclosed in application Ser. No. 716,862 to Meijer and assigned to the same assignee as the present invention additionally negates the attenuating properties of varying fluid opacities by using different light intensity thresholds for the incorporated sensors.

Impliedly, air-in-line detectors are exclusively concerned with the detection of air bubbles in the IV line itself. It makes no difference how the air enters the line. In addition to the beneficial attributes of an air-in-line detector, there are situations involving medical devices, i.e., controllers and/or pumps, when it is desirable to cease the operation of the medical device upon the depletion of fluid from the fluid source. And this may be so even though there is no air in the IV line. Accordingly, the ability to determine when the fluid source is depleted has several advantages. First, if the depletion of the fluid source can be detected, the medical device can be stopped before air is brought into the operating system of the medical device and into the IV infusion tube. Second, the ability to stop the operation of the medical device before air enters the system allows for rapid replacement of the fluid source with no need to reprime the medical device. Additionally, the empty container detector envisioned by the present invention is placed in fluid communication with the fluid source and is not an integral part of the medical device. Thus, it has flexibility and can be associated with the fluid source of various medical devices regardless of the particular type or construction of the medical device.

In light of the foregoing, the present invention recognizes that there is a need for a detector which is capable of direct association with the fluid source and which is able to provide accurate information concerning the presence or absence of fluid in the container. Accordingly, it is an object of the present invention to provide an empty container detector which will provide accurate information on the fluid level in a fluid container. It is another object of the present invention to compare a control signal with a normalized reference signal which is independent of the material used for construction of the fluid container so long as the container is transparent to light. Still another object of the present invention is to provide a detector which is effective for determining fluid level in a fluid container regardless whether the fluid is transparent, opalescent or opaque. Yet another object of the invention is to provide an easily manufacturable, cost effective and easy to use empty container detector which is easily adaptable for use in a multitude of medical environments.

SUMMARY OF THE INVENTION

A preferred embodiment of the novel empty container detector includes a photoelectric transducer which is normally associated with a transparent fluid container below the fluid level in the container to generate a variable control signal. As envisioned by the present invention, the control signal is variable between a first state wherein fluid is detected and a second state wherein an absence of fluid is indicated. The empty container detector of the present invention further comprises another photoelectric transducer which is associated with the container above the fluid level in the container to establish a reference signal. Electrical connecting means are incorporated to normalize and linearize the control si9nal relative to the reference signal. A comparator means is provided for the present invention to alarm and indicate an empty container condition whenever the normalized control signal is substantially equivalent to the reference signal. Stated differently, the detector of the present invention indicates an empty container whenever the control signal is in the second state and the second state is substantially equivalent to the reference signal.

The novel features of this invention as well as the invention itself, both as to its structure and operation, will be best understood from the accompanying drawings taken in conjunction with the accompanying description in which similar reference characters refer to similar parts and in which:

BRIEF DESCRIPTION OF THE DRAWINGS

FIG. 1 is an elevational view of the empty container detector in association with a drip chamber;

FIG. 2 is a cross-sectional view of the empty container detector and associated drip chamber as seen along the lines 2—2 in FIG. 1 with some parts removed for clarity;

FIG. 3 is a cross-sectional view of the empty container detector and associated drip chamber as seen along the line 3—3 in FIG. 1 with some parts removed for clarity;

DESCRIPTION OF THE PREFERRED EMBODIMENT

Figure 4:
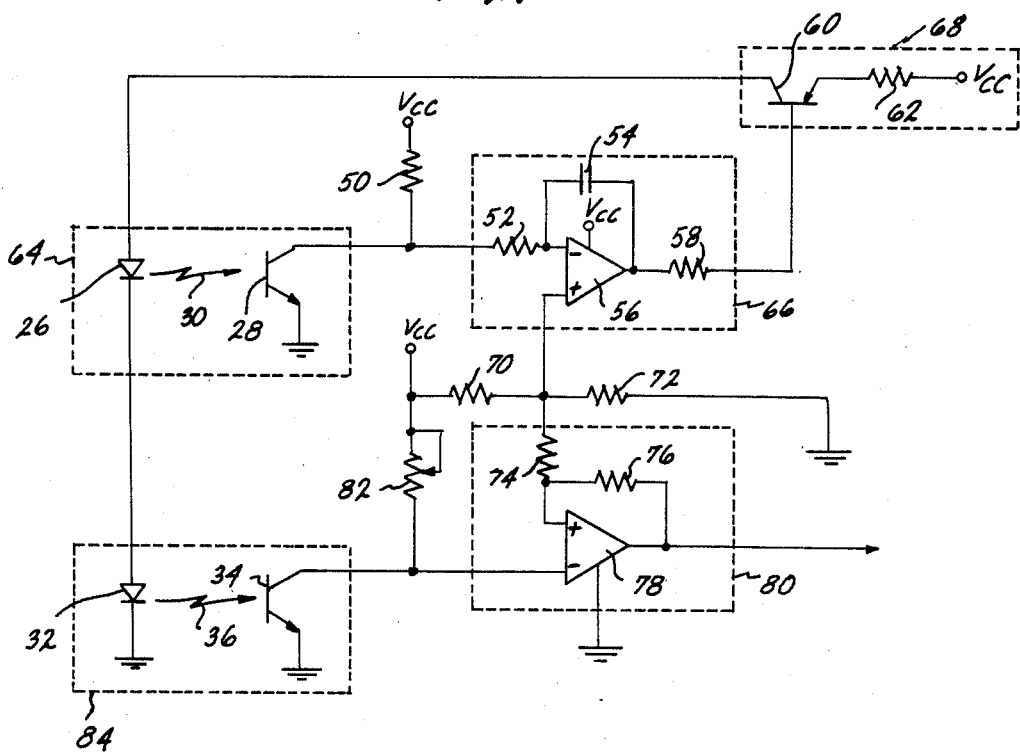
FIG. 4 is a circuit diagram of the electronic componentry of the present invention.

Referring to FIG. 1, the empty container detector of the present invention is shown and is generally designated as 10. More particularly, it is seen in FIG. 1 that the empty container detector 10 includes a casing 12 which is operatively associated in partial surrounding relationship with a drip chamber 14. As is well known to those skilled in the pertinent art, drip chamber 14 typically comprises a container 16 which is made from a clear resilient plastic material that allows pinching or squeezing of the container 16. Further, drip chamber 14 includes a standard type spike 18 which is associatable or connectable with a fluid source (not shown). Typically, drip chamber 14 is placed in fluid communication with a fluid source by the insertion of spike 18 into a stopple (not shown) or septum (not shown) which is associated with the fluid source. As also seen in FIG. 1, the drip chamber 14 has an associated tubing 20 which connects the drip chamber 14 into fluid communication with a medical device (not shown) or some other form of apparatus used to control the infusion to a patient of fluids which are passing through drip chamber 14.

In an operable state, drip chamber 14 is partially filled with fluid 22 to establish a fluid level 24 somewhere near the midpoint of container 16. As seen in FIG. 1, the empty container detector 10 is associated with drip chamber 14 in a manner to place a photoelectric transducer above fluid level 24 and another photoelectric transducer below fluid level 24. More specifically, as shown in phantom in FIG. 1, a photoelectric detector comprises an emitter (diode) 26 optically associated with a sensor (transistor) 28. As will be more apparent after further disclosure of the present invention, the emitter 26 and sensor 28 provide a photoelectric circuit which includes a light path 30 between emitter 26 and sensor 28.

As mentioned above, the circuitry created by emitter 26 and sensor 28 are disposed relative to drip chamber 14 so that light path 30 is above fluid level 24. As also seen in FIG. 1, empty container detector 10 further comprises an emitter (diode) 32 optically associated with a sensor (transistor) 34 to establish circuitry which includes a light path 36. Further, in accordance with the present invention, the circuitry created by emitter 32 and sensor 34 is positioned relative to drip chamber 14 so that when drip chamber 14 is normally operative, i.e., there is fluid in container 16 light path 36 passes through fluid 22 at a point below fluid level 24. Further, as shown in FIG. 1, the light paths 30 and 36 are arranged so that they are substantially parallel to each other.

The actual operation of emitter 26 and sensor 28 circuitry will be best understood by reference to FIG. 2 where it is seen that emitter 26 and sensor 28 are positioned relative to drip chamber 14 such that their alignment is offset from the longitudinal axis of drip chamber 14. Thus, it will be appreciated by the skilled artisan that light from emitter 26 when incident upon container 16 at the point 38 at any angle α to the normal 100 will be refracted by the container 16. Further, upon emergence of the light from container 16 into the air above fluid level 24 in container 16 at the point 40, light path 30 will again be refracted. This time the light is refracted so that the portion of path 30 between points 40 and 42 is substantially parallel to the path 30 between emitter 26 and point 38. Subsequently, the incidence of light at point 42 and its emergence at point 44 causes a further refraction of light path 30 that brings the light into alignment as an extension of the origin of path 30 and directs the light onto sensor 28. Recognize that the above described light path 30 results only when light path 30 passes through air in container 16 above fluid level 24. When a medium in container 16, other than air, lies between emitter 26 and sensor 28, the resultant light path will be substantially altered.

Where a medium, such as a fluid, is held in container 16, the light path will be similar to that shown in FIG. 3. In this case, although container 16 refracts light through the angle α, light is refracted from the normal 102 by an angle θ after entering the fluid in container 16. The light then continues along light path 36a and exits container 16, as shown in FIG. 3, without being incident upon sensor 34. This, of course, occurs so long as the fluid in container 16 allows for the passage of light. If the fluid in container 16 is opaque or sufficiently opalescent, the light will be attenuated instead of refracted. In either case, light will not be incident on sensor 34. Thus, regardless of the nature of the fluid, its mere presence will be sufficient to affect the incidence of light on sensor 34. According to the present invention, however, if the fluid level in drip chamber 14 falls below the light path 36 as indicated in FIG. 1, the light is no longer either refracted or effectively attenuated and, instead, is subjected to the same physical properties during its passage between emitter 32 and sensor 34 as is the light in transit between emitter 26 and sensor 28. Accordingly, when the fluid level 24 in drip chamber 14 falls below light path 36, the passage of light between emitter 32 and sensor 34 will be as shown by the light path 36 in FIG. 3. It will be understood by the skilled artisan that the present invention will be operable regardless whether visible or invisible light is used. In fact, it may be preferable to use infrared light rather than visible light.

It is recognized that a device incorporating a single photoelectric transducer circuit similar to the one shown in FIG. 3 that comprises an emitter 32 and a sensor 34 is able to provide rough approximations of the presence or absence of fluid. Specifically, since the presence of fluid 22 within container 16 will cause light to be either attenuated or refracted along path 36a at an angle θ from the normal 102 and the absence of fluid 22 will cause light to be refracted along path 36 at an angle α from the normal 102, the variation in light paths may be sufficient to establish the presence or absence of fluid in the container. However, in accordance with circuitry to be subsequently described in detail, light path 36 for the present invention is linearized and normalized with respect to light path 30 to account for physical variables which affect the functioning and reliability of the electrical circuitry between emitters 26 and 32 and their respective sensors 28 and 34. More specifically, in accordance with the present invention, variations due to the materials used for container 16 and changes in temperature are eliminated by referencing the lower photoelectric transducer with the upper photoelectric transducer.

Referring now to FIG. 4, the electrical circuitry of the present invention is seen in a schematic form. Specifically, it is seen that emitter (diode) 26 and sensor (transistor) 28 are positioned to establish a light path 30. A resistor 50 is connected between the voltage source $V_{cc}$ and transistor 28 to convert the current into the collector of transistor 28 into a voltage. The output of sensor (transistor) 28 is also connected with an amplifier stage 66 which comprises a resistor 52, an operational amplifier 56, a resistor 58 and a capacitor 54 connected as shown in FIG. 4 in a manner well known in the pertinent art. The output from amplifier stage 66 is then connected with a current controller 68 which comprises a transistor 60 and a resistor 62. As will be appreciated by those skilled in the pertinent art, photoelectric transducer 64, amplifier stage 66 and current controller 68 collectively establish a servo loop. For reasons well known in the pertinent art, current controller 68 is provided in the servo loop as a current amplifier. For this purpose, resistor 62 limits the maximum current available within the servo loop to prevent overdriving emitters 26 and 32. For instance, a blockage of light path 30 in photoelectric transducer 64 will cause excessive current flow. Further, the servo loop will operate at a set point voltage which is established by the system input voltage $V_{cc}$ and the values used for resistor 70 and resistor 72. Since the container 16 is placed in light path 30, it is effectively made part of this circuitry. Thus, the materials used in the manufacture of container 16 affect the value of the current in the servo loop. Likewise, the individual component electrical and electro-optical paramaters are affected by the ambient temperature. Consequently, these factors are no longer variables which must be accounted for and the current in the servo loop can be used as a reference signal.

Also shown in FIG. 4 is a second photoelectric transducer 84 which is comprised of an emitter (diode) 32, a sensor (transistor) 34 and their associated light path 36. The output from photoelectric transducer 84 is shown in FIG. 4 as an input to the comparator 80 which includes an operational amplifier 78 having positive feedback through a resistor 76. Also shown as part of comparator 80 is a resistor 74. As will be appreciated by those skilled in the pertinent art, the value of resistor 76 can be made sufficiently high relative to the value of resistor 74 to provide hysteresis which, by virtue of positive feedback to operational amplifier 78, will sufficiently bias the output of comparator 80 so that variations in the input to comparator 80 which are less than the hysteresis will not affect the output of comparator 80.

A variable resistor 82 is shown in FIG. 4 that is adjustable to establish a margin which is the effective difference between the input to amplifier stage 66 and the input to comparator 80. In accordance with well known servo loop techniques, the input voltage to amplifier stage 66 through resistor 52 is held equal to the reference voltage determined by the values set for resistors 70 and 72. On the other hand, variable resistor 82 will establish the input voltage to comparator 80. And, for reasons to be discussed, a difference in these inputs is generally necessary. Of course, when container 16 is emptied of a clear fluid, it can be expected that current flow through transistor 34 will substantially equal the current flow through transistor 28 since emitters 26 and 32 are in series. However, when an opaque or opalescent fluid is emptied from container 16, a residue may remain on the sides of container 16 which will attenuate but not refract light path 36. In this latter case, the current flow through transistor 34 will remain less than the current flow through transistor 28 despite the fact that container 16 is empty. Thus, it is necessary that variable resistor 82 be set at a level which allows a lower output voltage from transistor 34 to be handled by detector 10 as substantially equivalent to the higher output voltage of transistor 28. In other words, variable resistor 82 establishes a minimum level above which the output voltage of comparator 80 will alarm the detector 10. As envisioned by the present invention, the output voltage of comparator 80 is a control signal which is continuously compared with the reference signal established in the servo loop. When the control signal output of comparator 80 rises to a predetermined fraction of the reference signal set by the servo loop, the detector 10 alarms to indicate an empty condition for container 16. In other words, when light path 30 and light path 36 are substantially similar and photoelectric transducer 84 is providing an output voltage that is greater than a predetermined fraction of the output voltage of photoelectric transducer 64, an alarm is triggered in detector 10 to indicate an empty container 16.

Figure 5A:
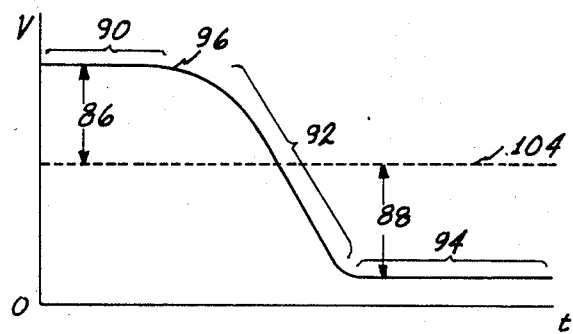
FIG. 5A is a graphical plot of the variation in output voltage of a photoelectric sensor as indicated under certain operating conditions.
Figure 5B:
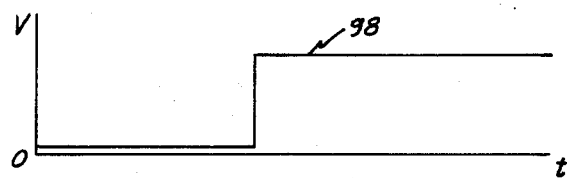
FIG. 5B is a graphical plot of the electrical output of the circuitry shown in FIG. 4 under certain operating conditions.

A further appreciation of the relationship between voltage output of the photoelectric transducer 84 and control signal output from comparator 80 can be had by reference to FIGS. 5A and 5B. Both FIGS. 5A and 5B are graphical plots of voltage with respect to time. More specifically, FIG. 5A is a time representation of the signal voltage change at the collector of transistor 34 as fluid level 24 drops below light path 36. As seen in FIG. 5A, the voltage of sensor (transistor) 34 will be in the region 90 when the fluid level 24 is above the light path 36. As the fluid level 24 recedes across light path 36, the voltage output of sensor (transistor) 34 will vary according to time as shown in the region 92 of FIG. 5A until a voltage corresponding to region 94 is attained when the fluid level 24 is below the light path 36. It will be appreciated that the transition through region 92 will depend in large part on the opalescence of the fluid. Thus, it can be seen in FIG. 5A that for normal operation with fluid level 24 above the light path 36, corresponding to fluid present in the container, a positive interval 86 is established between the operating voltage and a reference voltage indicated by the dashed line 104 in FIG. 5A.

The comparision of FIG. 5A with FIG. 5B shows that the voltage output of comparator 80 represented in FIG. 5B is dependent upon the voltage output of sensor (transistor) 34 shown as the voltage level 96 in FIG. 5A. The control voltage 98 output from comparator 80 is seen to appear as a step-function which changes state according to the voltage level 96 in FIG. 5A. Through appropriate circuitry, the voltage level 98 representing the output from comparator 80 can be used by electronic circuitry well known in the art to trigger an alarm which indicates the absence of fluid in the light path 36. From the foregoing it will be recognized that the absence of fluid in light path 36 corresponds to a condition where fluid 22 has been depleted from drip chamber 14 and which further indicates that the fluid source which is connected in fluid communication with drip chamber 14 has likewise been depleted of fluid.

OPERATION

In its operation the empty container detector 10 of the present invention is operatively associated with a drip chamber 14 which has been connected in fluid communication with a fluid source. Upon connection of drip chamber 14 with a fluid source by means of spike 18, the container 16 of drip chamber 14 is squeezed to allow a partial filling of the drip chamber 14 to a fluid level 24 as shown in FIG. 1. It will be appreciated that with drip chamber 14 in fluid communication with a fluid source, the air trapped in drip chamber 14 above fluid 22 will maintain the fluid level 24 substantially as shown in FIG. 1 so long as there is fluid in the fluid source. Thus, it is a purpose of the empty container detector 10 of the present invention to determine when the fluid level 24 falls below a predetermined level in drip chamber 14 and then alarm to indicate the depletion of fluid from the fluid source. Accordingly, the empty container detector 10 comprises a first photoelectric transducer 64 which is operatively associated with the drip chamber 14 and disposed relative to drip chamber 14 above fluid level 24. Also, the empty container detector 10 includes a photoelectric transducer 84 which is associated with drip chamber 14 at a point below fluid level 24 in drip chamber 14.

A reference signal is established by photoelectric transducer 64 and a control signal is established by photoelectric transducer 84. Since photoelectric transducer 64 is disposed above fluid level 24, the reference signal corresponds to air in container 16. On the other hand, transducer 84 is disposed below fluid level 24. By virtue of the refraction of light path 36 in photoelectric transducer 84 in the presence of fluid 22 in drip chamber 14, the photoelectric transducer 84 will have a minimal output. Upon depletion of fluid from the fluid source, the partial vacuum above fluid 22 in drip chamber 14 is relieved and the fluid level 24 recedes through the drip chamber 14. Upon passage of fluid level 24 past the light path 36 of photoelectric transducer 84, the output of photoelectric transducer 84 is changed since light path 36 is no longer refracted or blocked by the presence of fluid in drip chamber 14. Accordingly, the control signal output of comparator 80 is altered. An alarm is triggered to indicate depletion of fluid from the fluid source, i.e., an empty fluid container, when the control signal exceeds a predetermined fraction of the reference signal.

While the particular empty container detector as herein shown and disclosed in detail is fully capable of obtaining the objects and providing the advantages herein before stated, it is to be understood that it is merely illustrative of the presently preferred embodiment of the invention and that no limitations are intended to the details of construction or design herein shown other than as defined in the appended claims.

I claim:

1. A fluid level detector for use with a transparent fluid container which comprises;
   a photoelectric transducer associated with said container having its light path aimed through said container for operating in a first state when said light path is refracted by a fluid in said container and operating in a second state when said light path is unrefracted by a fluid;
   means associated with said container to establish a normalized input to said photoelectric transducer corresponding to no fluid in said container; and
   an alarm associated with said transducer to indicate an empty container when said second state is a calibrated equivalent to a no fluid condition as established by said normalized input.

2. A detector as cited in claim 1 wherein said means for establishing the normalized input is a second photoelectric transducer having its light path aimed through said container above the fluid surface.

3. A detector as cited in claim 2 wherein the light path of said photoelectric transducer is substantially parallel to the light path of said second photoelectric transducer.

4. A detector as cited in claim 3 wherein said photoelectric transducer has an emitter and a sensor, said second photoelectric transducer has an emitter and a sensor, and the light from said emitters is incident on said container at an angle from the normal to the surface of said container at the point of incidence.

5. A detector as cited in claim 4 wherein said container is a cylindrical-shaped IV drip chamber.

6. A detector as cited in claim 4 wherein said photoelectric transducer and said second photoelectric transducer are operable with invisible light.

7. A fluid detector which comprises:
   a first photoelectric means;
   a second photoelectric means coupled to said first photoelectric means for generating a reference signal for input to said first photoelectric means, said reference signal corresponding to the condition when a fluid does not affect the light path of said second photoelectric means;
   means associated with said first photoelectric means for generating a variable control signal, said control signal being in a first state when fluid substantially affects the light path of said first photoelectric means and in a second state when fluid does not substantially affect the light path of said first photoelectric means; and
   an alarm means associated said first photoelectric means to indicate the absence of fluid when said control signal is a calibrated equivalent of said reference signal.

8. A fluid detector as cited in claim 7 further comprising:
   a transparent container; and
   means for holding a portion of said container in the light path of said first photoelectric means.

9. A fluid detector as cited in claim 8 wherein said holding means holds a portion of said container in the light path of said second photoelectric means.

10. A fluid detector as cited in claim 9 wherein said first and second photoelectric means are operable with invisible light.

11. A method for detecting the emptying of a transparent fluid container which comprises the steps of:
   A. mounting a first photoelectric means on said container with the light path of said first photoelectric means passing through said container above the fluid level in said container to generate a reference signal corresponding to the condition wherein no fluid is in the light path of said first photoelectric means;
   B. connecting said reference signal from said first photoelectric means as input to a second photoelectric means;
   C. mounting said second photoelectric means on said container to generate a control signal, said control signal being in a first state when fluid substantially affects the light path of said second photoelectric means and in a second state when fluid does not substantially affect the light path of said second photoelectric means; and
   D. alarming to indicate an empty container condition when the second state of said control signal is a calibrated equivalent of said reference signal.

* * * * *